(12) United States Patent
Matsunaga et al.

(10) Patent No.: US 12,203,823 B2
(45) Date of Patent: Jan. 21, 2025

(54) LOOSENESS DETECTION SENSOR AND METHOD

(71) Applicant: Nippon Telegraph and Telephone Corporation, Tokyo (JP)

(72) Inventors: Eri Matsunaga, Musashino (JP); Tadashi Minotani, Musashino (JP); Masahito Nakamura, Musashino (JP); Masayuki Tsuda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 266 days.

(21) Appl. No.: 17/794,155

(22) PCT Filed: Jan. 24, 2020

(86) PCT No.: PCT/JP2020/002555
§ 371 (c)(1),
(2) Date: Jul. 20, 2022

(87) PCT Pub. No.: WO2021/149248
PCT Pub. Date: Jul. 29, 2021

(65) Prior Publication Data
US 2023/0103121 A1    Mar. 30, 2023

(51) Int. Cl.
| | |
|---|---|
| *G01L 5/24* | (2006.01) |
| *F16B 31/02* | (2006.01) |
| *G01N 29/04* | (2006.01) |
| *G01N 29/12* | (2006.01) |

(Continued)

(52) U.S. Cl.
CPC .............. *G01L 5/246* (2013.01); *F16B 31/02* (2013.01); *G01N 29/045* (2013.01); *G01N 29/12* (2013.01); *G01N 29/4427* (2013.01); *F16B 2031/022* (2013.01); *G01N 29/223* (2013.01)

(58) Field of Classification Search
CPC .. G01N 29/045; G01N 29/12; G01N 29/4427; G01N 29/223; G01L 5/24; G01L 5/246; G01M 13/00; G01H 13/00; F16B 31/02; F16B 2031/022
See application file for complete search history.

(56) References Cited

U.S. PATENT DOCUMENTS

2014/0129158 A1    5/2014    Shea

FOREIGN PATENT DOCUMENTS

| GB | 2176727 A | * | 1/1987 | ............ B23P 19/033 |
|---|---|---|---|---|
| JP | 2001-159572 A | | 6/2001 | |
| JP | 2005-77298 A | | 3/2005 | |

(Continued)

OTHER PUBLICATIONS

Tomotsugu Sakai et al., *Measurement of Bolt Axial Force Using Ultrasonic Waves*, Proceedings of the Japan Society of Mechanical Engineers, vol. 43, No. 366, 1977, pp. 723-729.

*Primary Examiner* — Benjamin R Schmitt
(74) *Attorney, Agent, or Firm* — Workman Nydegger

(57) ABSTRACT

A looseness detection sensor for detecting looseness of a bolt for fixing a component, including: a resonance unit arranged adjacent to a head portion of the bolt and made of an insulating material confining a high-frequency signal input externally; and a conductive member in conduction with the component across the resonance unit, wherein the conductive member is a cap put on the head portion of the bolt and includes a protrusion contacting a surface of the component.

6 Claims, 8 Drawing Sheets

(51) Int. Cl.
   *G01N 29/44* (2006.01)
   *G01N 29/22* (2006.01)

(56) References Cited

FOREIGN PATENT DOCUMENTS

JP       2015-203638 A    11/2015
WO    WO-2017203220 A1 *  11/2017  .............. F16B 31/02

* cited by examiner

Fig. 4
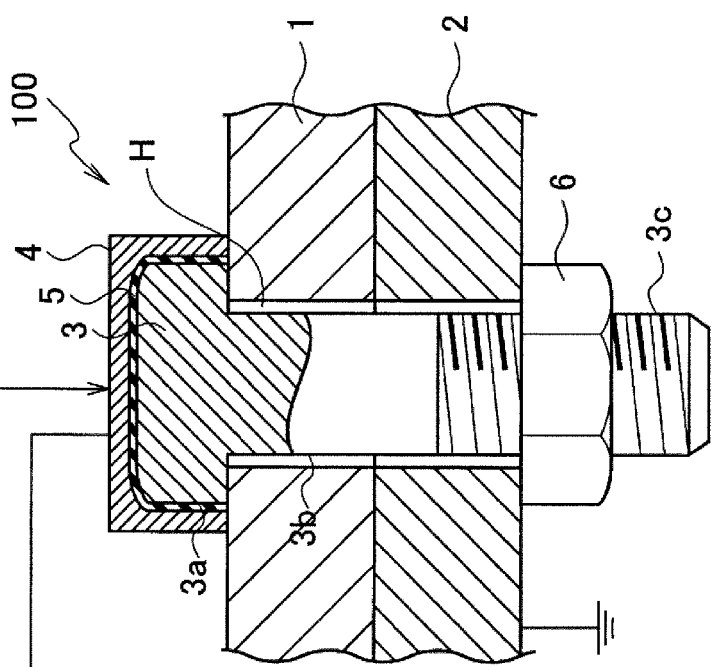
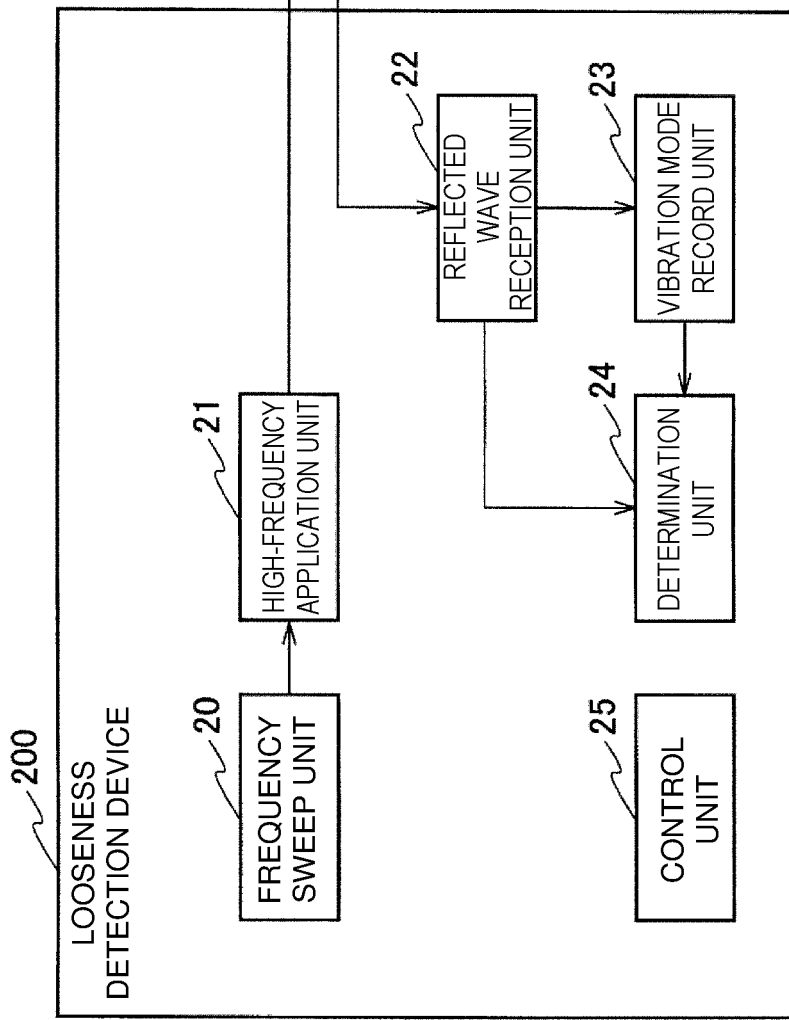

LOOSENESS DETECTION SENSOR AND METHOD

TECHNICAL FIELD

The present invention relates to a looseness detection sensor for detecting looseness of a bolt for fixing a component and a looseness detection method using the same.

BACKGROUND ART

Bolts are used to tighten and fix components to each other and used in various applications from large-scale facilities such as infrastructural structures and plant facilities to common products such as vehicles, play equipment, and furniture. At the joint portion of a bolt, a degradation such as compositional deformation or fatigue due to vibration or excessive force may cause looseness or drop-off.

These cause, for example, a bridge collapse accident, leakage of gas and liquid from the joint portion, breakage of play equipment, an accident causing injury by an object falling down from a high place, and the like. In order to prevent these accidents, there are a method of marking bolts and monitoring misalignment of alignment marks, a hammering test, an inspection method using ultrasonic waves (Non-Patent Literature 1), and the like.

CITATION LIST

Non-Patent Literature

Non-Patent Literature 1: Tomotsugu Sakai and two others, "Clamping Force Measurement with Ultrasonic Waves", Transactions of the Japan Society of Mechanical Engineers, Vol. 43, No. 366 (1977).

SUMMARY OF THE INVENTION

Technical Problem

However, the method of monitoring misalignment of alignment marks and the hammering test are not suitable for inspection of a portion that is difficult to visually check because the subject under inspection is located where it is difficult to see or at a distant location. Another problem is that they require experience and it is difficult for unexperienced operators to perform the inspection.

In addition, the inspection method using ultrasonic waves estimates the axial force of a screw based on a resonance frequency and has a complex configuration involving an ultrasonic probe, an ultrasonic sweep oscillator, a frequency counter, an oscilloscope and the like. As such, a conventional problem is that there are no devices and methods suitable for inspection of looseness of a portion where components are tightened with a bolt.

An object of the present invention, which has been made in view of this problem and, is to provide a looseness detection sensor suitable for inspecting looseness of a bolt in a constructed structure or the like and a looseness detection method using the same.

Means for Solving the Problem

A looseness detection sensor according to an aspect of the present invention is a looseness detection sensor for detecting looseness of a bolt for fixing a component, and has main points in including: a resonance unit arranged adjacent to a head portion of the bolt and made of an insulating material confining a high-frequency signal input externally; and a conductive member in conduction with the component across the resonance unit.

In addition, a looseness detection method according to an aspect of the present invention is a looseness detection method performed by a looseness detection device for detecting looseness of a bolt for fixing a component, and has main points in including: a sensor attachment step of attaching, to a head portion of the bolt, a looseness detection sensor including a resonance unit arranged adjacent to the head portion and made of an insulating material confining a high-frequency signal input externally and a conductive member in conduction with the component across the resonance unit; a high-frequency send and reception step of sweeping and applying a high-frequency signal in a predetermined range of frequencies to the looseness detection sensor and receiving a reflected wave of the high-frequency signal; a peak value record step of recording a peak value of the reflected wave; a comparison step of comparing the peak value and a previous peak value and calculating an amount of change; and a determination step of determining that the looseness does not occur when the amount of change is less than a threshold and determining that the looseness occurs when the amount of change is greater than or equal to the threshold.

Effects of the Invention

According to the present invention, in particular, it is possible to provide a looseness detection sensor suitable for inspecting looseness of a bolt in a constructed structure or the like and a looseness detection method using the same.

BRIEF DESCRIPTION OF DRAWINGS

FIG. 4 is a block diagram showing an example functional configuration of the looseness detection device shown in FIG. 3.

DESCRIPTION OF EMBODIMENTS

Figure 1:
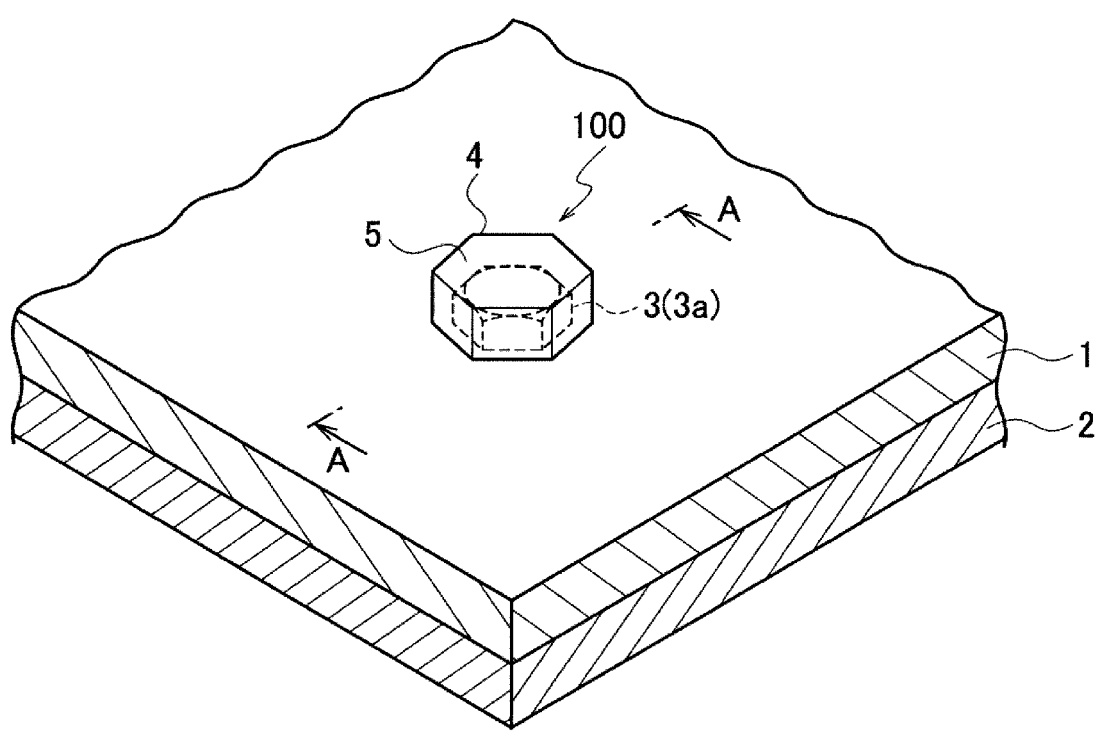
FIG. 1 is a perspective view showing an example of a looseness detection sensor according to a first embodiment of the present invention.

Embodiments of the present invention will be described below by using the drawings. The same components in a plurality of figures are given the same reference characters, and their descriptions are not repeated.

Looseness Detection Sensor FIG. 1 is a perspective view showing an example of a looseness detection sensor according to a first embodiment of the present invention. A looseness detection sensor 100 shown in FIG. 1 detects looseness of a bolt for fixing a component.

FIG. 1 shows an example of fixing two components 1 and 2 with a bolt 3. The components 1 and 2 are steel materials, for example. Note that the looseness detection sensor 100 can also be used to attach, to a product A (for example, a staircase), another product B (for example, a handrail).

The looseness detection sensor 100 includes a resonance unit 5 and a conductive member 4. The resonance unit 5 is arranged between a head portion 3a of the bolt 3 and the conductive member 4 and made of an insulating material confining a high-frequency signal input externally. The insulating material is an urethane or epoxy resin having high weather resistance, for example. The thickness of the resonance unit 5 is approximately several hundreds of μm, for example, although not particularly limited.

The conductive member 4 is in conduction with the component 1 across the resonance unit 5. The conductive member 4 shown in FIG. 1 represents an example of a cap put on the head portion 3a of the bolt 3 across the resonance unit 5. Hereinafter, the conductive member 4 may be referred to as a cap 4.

Figure 2:
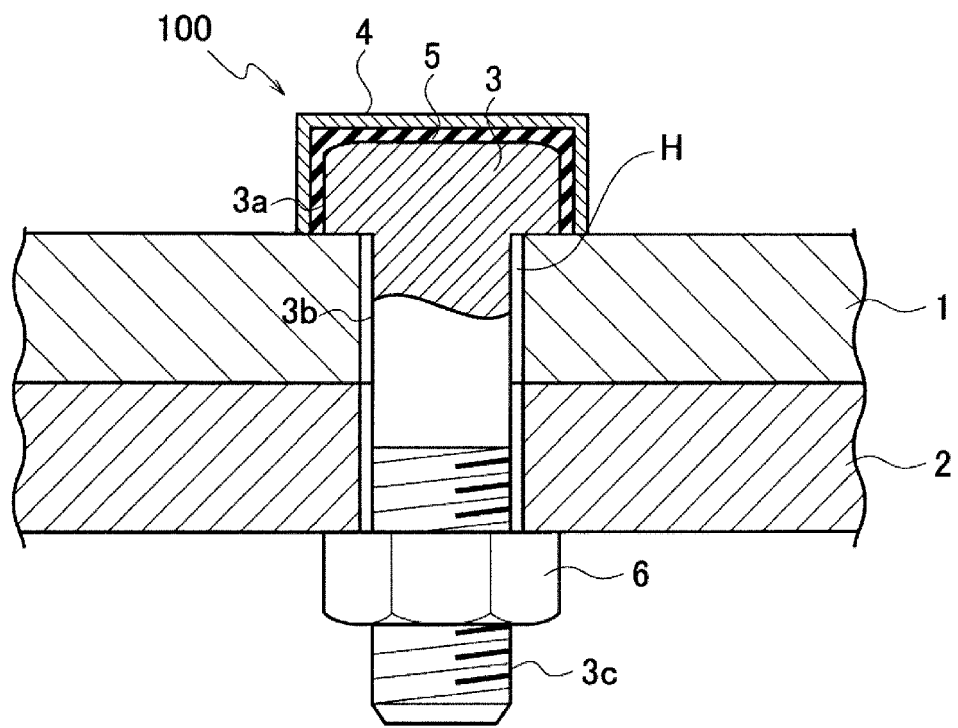
FIG. 2 is a structural cross-sectional view along line A-A shown in FIG. 1.

FIG. 2 is a structural cross-sectional view along line A-A shown in FIG. 1. Regarding the bolt 3 shown in FIG. 2, only the head portion 3a and a portion of a shaft 3b of the bolt 3 are shown in cross section. Other portions are shown in external appearance.

As shown in FIG. 2, the looseness detection sensor 100 is fitted to the head portion 3a of the bolt 3. Note that washers (not shown) may be arranged between the bolt 3 and the component 1 and between the component 2 and a nut 6.

The cap 4 is made of a stainless steel material, for example. The cap 4 and the component 1 are put in conduction when a peripheral end surface of the cap 4 facing the component 1 contacts a surface of the component 1.

A high-frequency signal swept in a predetermined frequency range is externally applied to the cap 4. A partial frequency (resonance frequency) of the applied high-frequency signal is confined in the resonance unit 5. The resonance frequency confined in the resonance unit 5 changes with the degree of tightening of the bolt 3. Thus, looseness of the bolt 3 can be detected by measuring a change in the resonance frequency confined in the resonance unit 5. The detection method will be described later.

Figure 3:
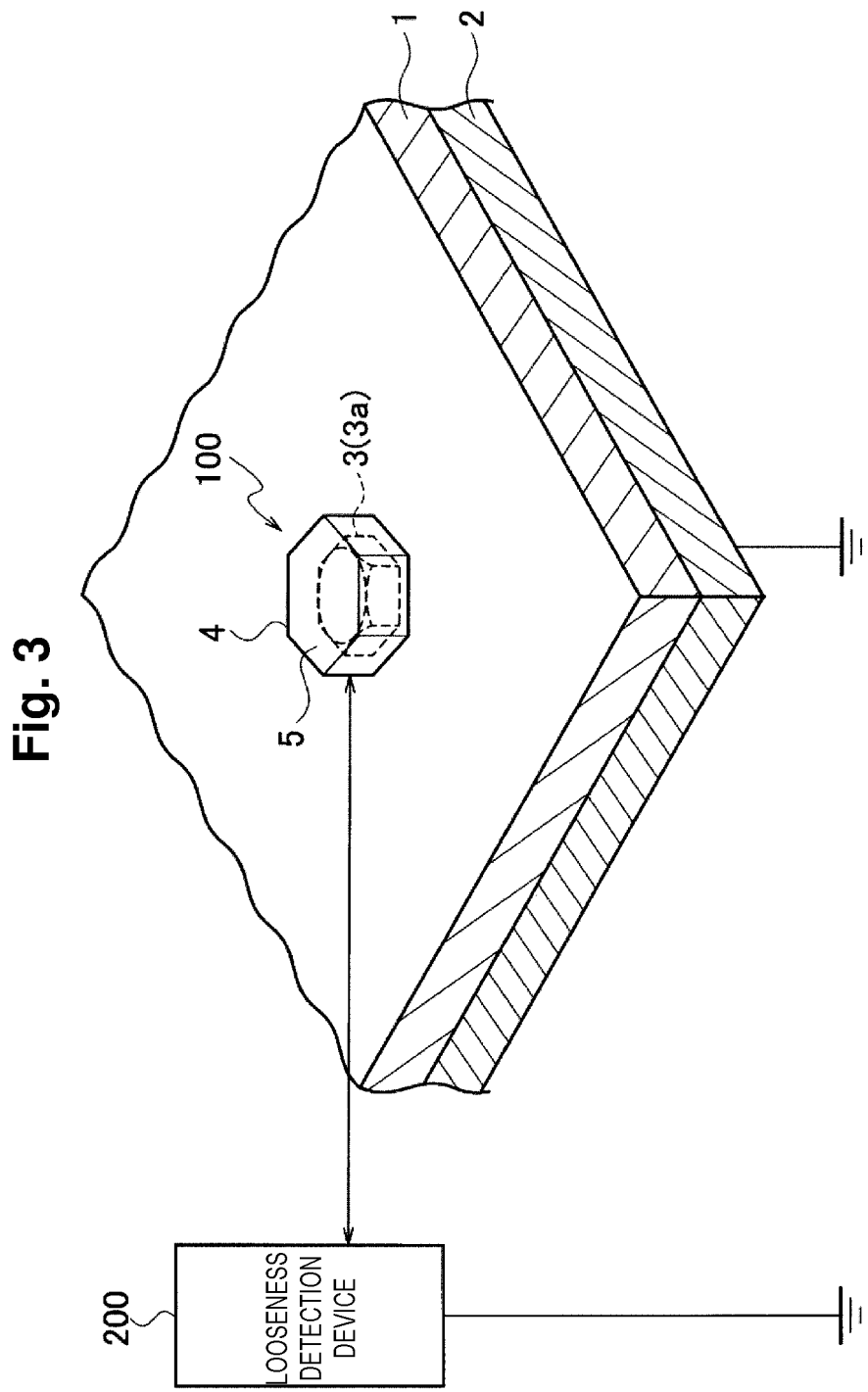
FIG. 3 is a schematic diagram showing the looseness detection sensor and a looseness detection device according to the first embodiment of the present invention.

FIG. 3 is a schematic diagram showing the looseness detection sensor 100 and a looseness detection device 200 according to the present embodiment. The looseness detection device 200 sweeps and applies a swept high-frequency signal to the cap 4, and detects the resonance frequency confined in the resonance unit 5.

Looseness Detection Device

FIG. 4 is a block diagram showing an example functional configuration of the looseness detection device 200 according to the embodiment of the present invention.

The looseness detection device 200 includes a frequency sweep unit 20, a high-frequency application unit 21, a reflected wave reception unit 22, a vibration mode record unit 23, a determination unit 24, and a control unit 25. The control unit 25 is a functional unit for controlling the operation of other units and, for example, can be constituted by a computer including a ROM, a RAM, a CPU and the like. If the control unit 25 is realized by a computer, it is possible that a part of the reflected wave reception unit 22, the vibration mode record unit 23, and the determination unit 24 are constituted by the computer.

The frequency sweep unit 20 repeats sweeping of a high-frequency signal in a range of 0.5 GHz to several GHz, for example. The high-frequency application unit 21 amplifies the high-frequency signal generated by the frequency sweep unit 20 such that it is measurable in a detection target structure, and applies it to the cap 4.

The reflected wave reception unit 22 receives the resonance frequency confined in the resonance unit 5. The high-frequency signal outside the resonance frequency is absorbed by the structures of the components 1 and 2 and therefore cannot be measured.

On the other hand, the resonance frequency of the structures of the cap 4, the resonance unit 5, the component 1, the component 2, and the bolt 3 is repeatedly reflected inside the resonance unit 5, and therefore can be measured by receiving the reflected wave. The resonance frequency changes with the degree of tightening of the bolt 3.

For example, when the bolt 3 is appropriately tightened, the specific resonance frequency (vibration mode) determined by the structures can be measured. When the bolt 3 is loosened, the conduction between the cap 4 and the component 1 is removed, and the resonance frequency (vibration mode) changes.

The vibration mode record unit 23 records the specific resonance frequency (vibration mode) determined by the structures. The vibration mode record unit 23 records in advance the resonance frequency when the bolt 3 is appropriately tightened.

Figure 5:
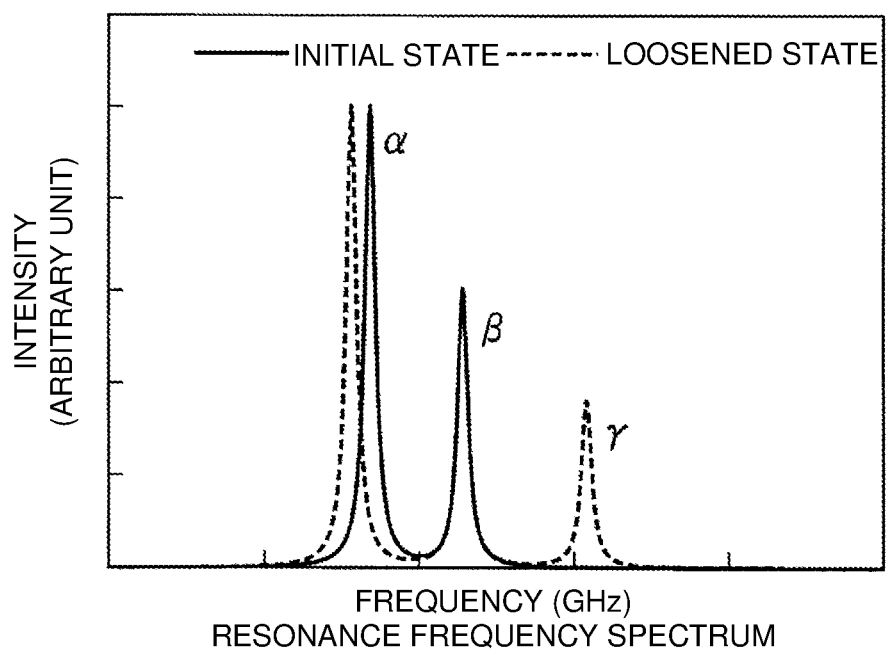
FIG. 5 is a diagram schematically showing a resonance frequency spectrum.

When the bolt 3 loosened, the reflected wave reception unit 22 receives a different resonance frequency than when the bolt 3 is appropriately tightened. FIG. 5 is a diagram schematically showing changes in the resonance frequency spectrum. In FIG. 5, the horizontal axis indicates the frequency (GHz) and the vertical axis indicates the intensity of resonance frequency spectrum (arbitrary unit).

FIG. 5 shows an example in which two spectra of α and β are measured in an initial state where the bolt 3 is appropriately tightened (solid line), and α is shifted toward the low-frequency side and a new spectrum γ is measured in a state where the bolt 3 is loosened (broken line).

The determination unit 24 determines that no looseness occurs when the amount of change in the resonance frequency shown in FIG. 5 is less than a threshold, and determines that looseness occurs when the amount of change is greater than or equal to the threshold. The threshold may be a predetermined frequency value, or may be the number of spectra newly measured. The threshold may also be both of the predetermined frequency value and the number of spectra.

As described above, it is possible to detect looseness of the bolt 3 by using the looseness detection sensor 100 and the looseness detection device 200 according to the present embodiment.

Modification 1

Figure 6A:
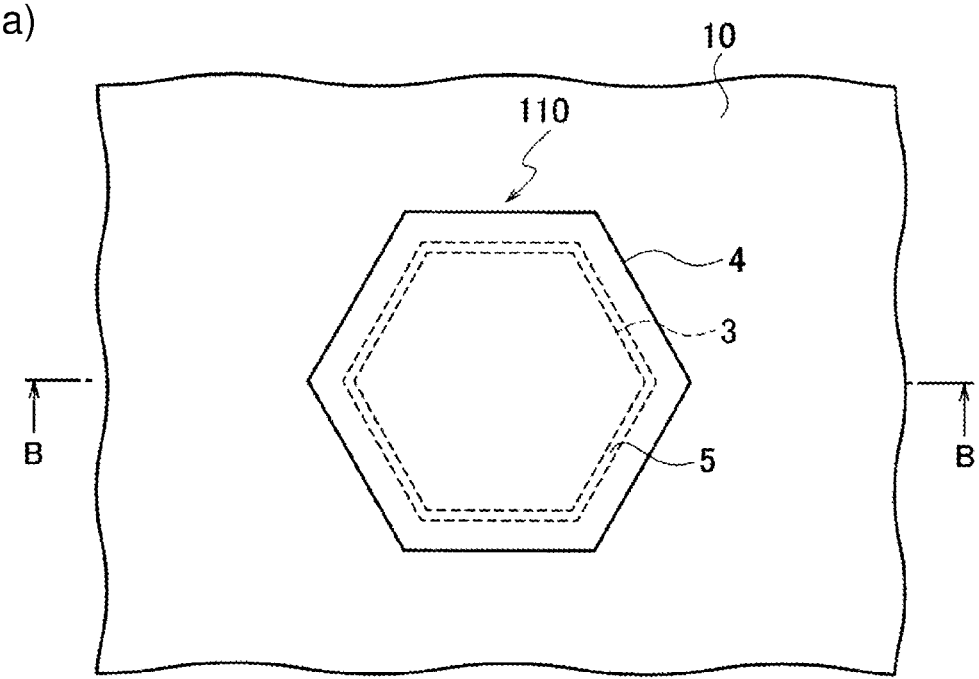
FIG. 6 is a diagram showing a modification of the looseness detection sensor shown in FIG. 1, where (a) is a plan view and (b) is a structural cross-sectional view along line B-B shown in (a).

FIG. 6 is a diagram showing a modification 1 of the looseness detection sensor 100, where (a) is a plan view seen from the side of the head portion 3a of the bolt 3 and (b) is a structural cross-sectional view along line B-B shown in (a).

The cap 4 of the looseness detection sensor 110 shown in FIG. 6 is different from that in the looseness detection sensor 100 (FIG. 2) in that it includes protrusions $4a_1$ and $4a_2$ contacting the surface of the component 1.

Figure 6B:
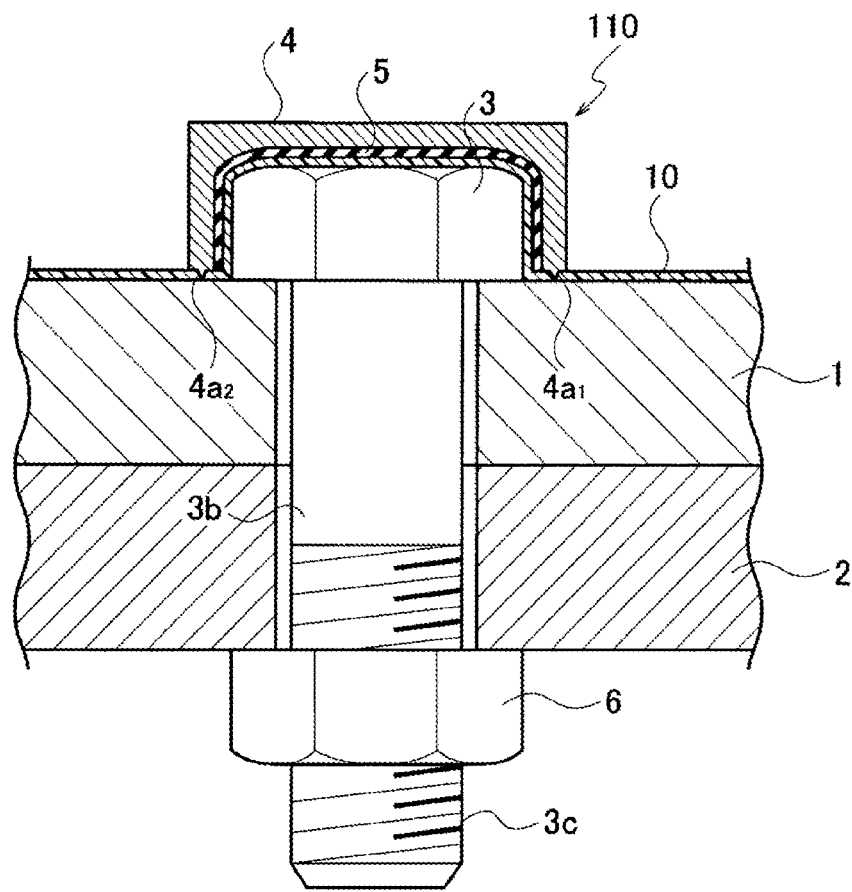

In general, after the bolt 3 is tightened, coating is often applied for the purpose of preventing rust on its surface. As shown in FIG. 6(b), the protrusions $4a_1$ and $4a_2$ break through coating 10 on the surface of the component 1 to bring the cap 4 into contact with component 1.

The height of the protrusions $4a_1$ and $4a_2$ is set to be greater than or equal to the thickness of the coating 10. When the thickness of the coating 10 is 1 mm, for example, the height of the protrusions $4a_1$ and $4a_2$ is set to 1.1 mm or more.

After the looseness detection sensor 110 is put on the head of the bolt 3, by tapping the cap 4 with a wooden hammer or the like, the tips of the protrusions $4a_1$ and $4a_2$ break through the coating 10 and the tips contact the surface of the component 1. Note that, if the coating 10 is hard, holes may be opened in advance in the coating 10 at portions contacted by the protrusions $4a_1$ and $4a_2$. The holes can be easily opened by a gimlet, a drill, laser irradiation or the like.

If the holes are opened in advance in the coating 10, the holes may be filled with a resin or the like so as to prevent the formation of rust. The resin preferably has elasticity like rubber, for example. This is because elasticity avoids hindrance to movement of the bolt 3.

By providing the protrusions $4a_1$ and $4a_2$ to the cap 4 in this manner, the conduction between the cap 4 and the component 1 can be reliably obtained. Note that, as shown in FIG. 6, the protrusions $4a_1$ and $4a_2$ may be provided at symmetric positions.

FIG. 6 shows an example in which the protrusion $4a_1$ and the protrusion $4a_2$ are provided on line B-B. By providing the protrusions at positions symmetric with respect to the shaft 3b of the bolt 3 in this manner, the looseness detection sensor 110 can be horizontally put on the head portion 3a of the bolt 3.

By horizontally putting the looseness detection sensor 110, it is possible to minimize lowering in the detection accuracy when the axis of the bolt 3 is inclined due to looseness. Thus, protrusions $4a_3$ and $4a_4$ (not shown) may be provided in a direction orthogonal to line B-B. In this manner, the protrusions $4a_1$ to $4a_4$ may be provided on four sides with respect to the axis of the bolt 3. Also, an even number of protrusions may be provided at eight portions or more.

As described above, the conductive member 4 (cap) according to this modification 1 includes the protrusions $4a_1$ and $4a_2$ contacting the surface of the component 1. In this manner, the conduction between the conductive member 4 and the component 1 can be reliably obtained. In addition, two or more protrusions $4a_1$ and $4a_2$ are provided at symmetric positions. In this manner, the conduction between the conductive member 4 and the component 1 can be reliably obtained, and the accuracy of detection of looseness can be improved.

Second Embodiment

FIG. 7 is a diagram showing an example of a looseness detection sensor according to a second embodiment of the present invention, where (a) is a plan view seen from the side of the head portion 3a of the bolt 3 and (b) is a structural cross-sectional view along line C-C shown in (a). Note that FIG. 7 shows an example in which the coating 10 is present on the surface of the component 1.

Figure 7A:
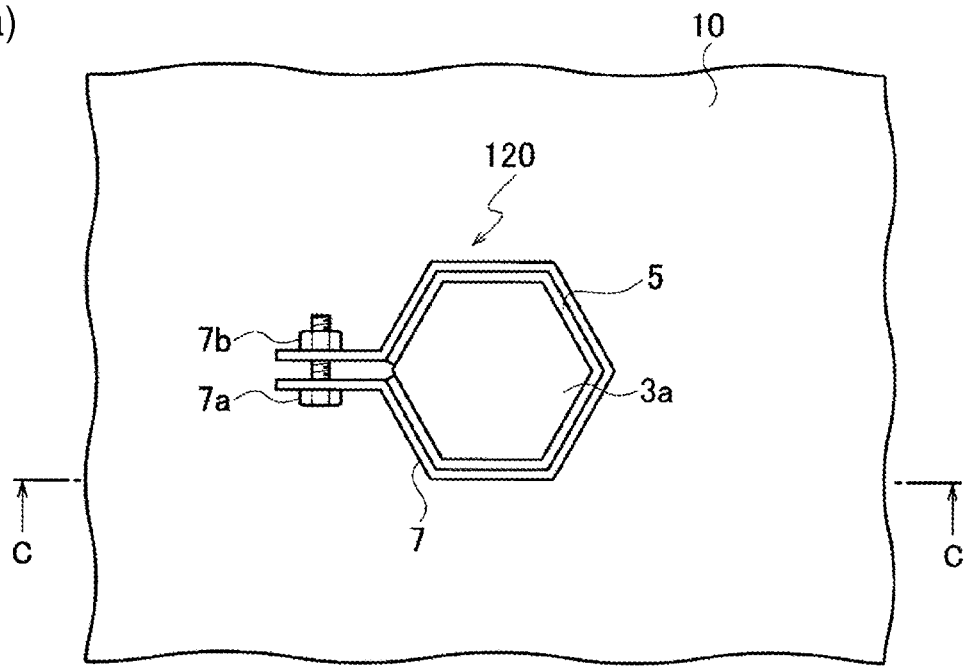
FIG. 7 is a diagram showing a looseness detection sensor according to a second embodiment of the present invention, where (a) is a plan view and (b) is a structural cross-sectional view along line C-C shown in (a).

A looseness detection sensor 120 shown in FIG. 7 is different from the looseness detection sensor 100 (FIG. 2) in that the conductive member 4 is in the form of a band 7 wound around the head portion 3a of the bolt 3 across the resonance unit 5. As shown in FIG. 7(a), the band 7 has a plan shape in which one vertex portion of a hexagon is divided and two divided end edges are extended in the direction of the vertex by a predetermined length.

Figure 7B:
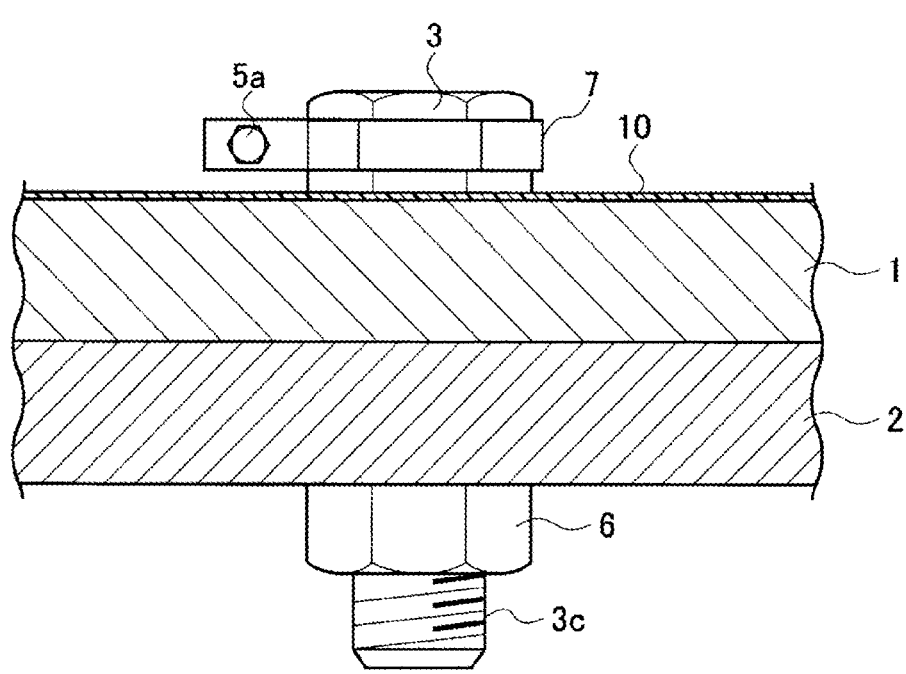

The extended portions have a rectangular side shape (FIG. 7(b)), and their opposite portions are fastened with a screw 7a and a nut 7b. The band 7 is made of a material having elasticity such as stainless steel, for example.

As shown in FIG. 7, the looseness detection sensor 120 is fitted on the head portion 3a of the bolt 3, and the band 7 is fixed to the head portion 3a of the bolt 3 by tightening the screw 7a. Note that the plan shape of the band 7 may also be a circle (a ring shape: not shown). As above, the conductive member 4 may be a band wound around the head portion 3a of the bolt 3.

In the case where the band 7 is not placed on the surface of the component 1 as shown in FIG. 7(b), the presence of the coating 10 on the surface of the component 1, in particular, prevents the conduction between the band 7 and the component 1. In this case, the protrusions shown in the modification 1 are provided on the inner side of the band 7.

Thus, the looseness detection sensor 120 according to the present embodiment can be modified similarly to the looseness detection sensor 100 and obtains the same operational effects as the looseness detection sensor 100. That is, the conductive member (band 7) may be provided with protrusions contacting the head portion 3a of the bolt 3. In this manner, the conduction between the conductive member (band 7) and the component 1 can be reliably obtained, and the accuracy of detection of looseness can be improved.

Looseness Detection Method

Figure 8:
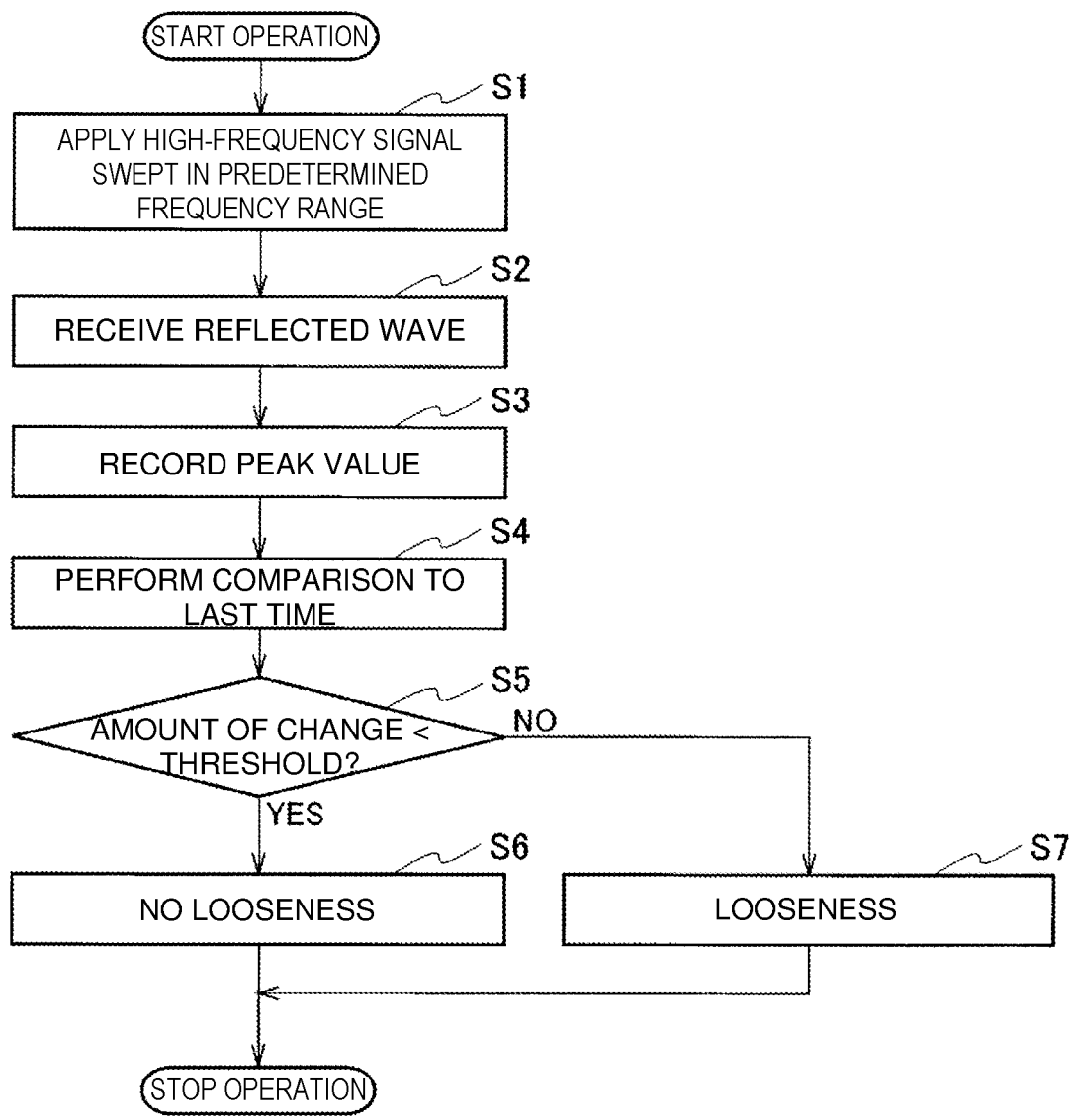
FIG. 8 is a flow chart showing processing procedures of a looseness detection method performed by using the looseness detection device shown in FIG. 3.

FIG. 8 is a flow chart showing processing procedures for detecting looseness of a bolt by using the looseness detection device 200 and the looseness detection sensor 100 described above.

To perform a looseness detection method according to an embodiment of the present invention, the looseness detection sensor 100 is first attached to the bolt of interest (step 0: not shown).

Next, the frequency sweep unit 20 starts sweeping a predetermined range of frequencies. Then, the high-frequency application unit 21 generates a high-frequency signal with frequencies swept by the frequency sweep unit 20, and applies it to the conductive member 4 of the looseness detection sensor 100 (step S1).

The reflected wave reception unit 22 receives a reflected wave reflected from the conductive member 4 (step S2). The reflected wave reception unit 22 may detect the vibration mode by performing fast Fourier transform on the reflected wave or may calculate a frequency at which input current is maximum or minimum.

The vibration mode record unit 23 records a peak value of vibration detected by the reflected wave reception unit 22 (step S3). The peak value of vibration is a frequency spectrum calculated by performing fast Fourier transform on the reflected wave. Alternatively, it is a frequency value at which input current is maximum.

The determination unit 24 first compares the obtained peak value and a peak value obtained previously to calculate the amount of change (step S4). Then, the determination unit 24 determines that no looseness occurs when the amount of change is less than a threshold (step S6), and determines that looseness occurs when the amount of change is greater than or equal to the threshold (step S7).

As described above, the looseness detection method according to the present embodiment is a looseness detection method performed by the looseness detection device 200 for detecting looseness of the bolt 3 for fixing the component 1, and includes: a sensor attachment step S0 of attaching, to the head portion 3a of the bolt 3, the looseness detection sensor 100 including the resonance unit 5 arranged adjacent to the head portion 3a and made of an insulating material confining a high-frequency signal input externally and the conductive member 4 in conduction with the component 1 across the resonance unit 5; a reflected wave reception step S2 of sweeping and applying a high-frequency signal in a predetermined range of frequencies to the looseness detection sensor 100 and receiving a reflected wave of the high-frequency signal; a peak value record step S3 of recording a peak value of the reflected wave; a comparison step S4 of comparing the peak value and a previous peak value and calculating an amount of change; and a determination step S5 of determining that the looseness does not occur when the amount of change is less than a threshold (step S6) and determining that the looseness occurs when the amount of change is greater than or equal to the threshold (step S7). In this manner, it is possible to easily detect looseness of a bolt in a constructed structure or the like.

As described above, the looseness detection sensor 100 according to the present embodiment and the looseness detection method using the same, which detect looseness of the bolt 3 for fixing the portion of interest based on a change in the frequency of the reflected wave, are suitable for inspection of a portion that is difficult to visually check because the subject under inspection is located where it is difficult to see or at a distant location.

In addition, it is possible to obtain a quantitative inspection result. In addition, by arranging the looseness detection sensor 100 and the looseness detection device 200 at distant positions, it is possible to remotely detect looseness of the bolt. The looseness detection sensor 100 and the looseness detection device 200 may be connected by a high-frequency signal line such as a micro-strip line. They may also be connected by a waveguide or the like.

In addition, the looseness detection device 200 may be arranged near the bolt 3 at a structurally pivotal portion so that the detection result is wirelessly sent. This can eliminate the risk associated with the inspection. It is also possible to reduce the inspection cost.

Note that the looseness detection sensor 100 of the present invention is not limited to the above-described embodiments. It can be widely applied to structures in which a component A is fixed to a component B. In addition, although an example in which the cap 4 and the band 7 have a hexagonal plan shape has been described, there is no limitation to this example. Their plan shape may also be quadrangular or circular.

Thus, the present invention is not limited to the above-described embodiments and can be modified within the scope of its spirit.

REFERENCE SIGNS LIST 1, 2 Component
3 Bolt
3a Bolt head portion
3b Shaft
4 Conductive member (cap)
$4a_1$ to $4a_4$ Protrusion
5 Resonance unit
6 Nut
7 Band (conductive member)
7a Screw
7b Nut
20 Frequency sweep unit
21 High-frequency application unit
22 Reflected wave reception unit
23 Vibration mode record unit
24 Determination unit
25 Control unit
100, 110, 120 Looseness detection sensor
200 Looseness detection device

The invention claimed is:

1. A looseness detection sensor for detecting looseness of a bolt for fixing a component, the looseness detection sensor comprising:
   a resonance unit arranged adjacent to a head portion of the bolt and made of an insulating material confining a high-frequency signal input externally; and
   a conductive member in conduction with the component across the resonance unit,
   wherein the conductive member is a cap put on the head portion.

2. The looseness detection sensor according to claim 1, wherein
   the conductive member further comprises a protrusion contacting a surface of the component or the head portion.

3. The looseness detection sensor according to claim 2, wherein two or more protrusions are provided at symmetric positions.

4. A looseness detection sensor for detecting looseness of a bolt for fixing a component, the looseness detection sensor comprising:
   a resonance unit arranged adjacent to a head portion of the bolt and made of an insulating material confining a high-frequency signal input externally; and
   a conductive member in conduction with the component across the resonance unit,
   wherein the conductive member comprises a protrusion contacting a surface of the component or the head portion.

5. The looseness detection sensor according to claim 4, wherein two or more protrusions are provided at symmetric positions.

6. A looseness detection method performed by a looseness detection device for detecting looseness of a bolt for fixing a component, the looseness detection method comprising:
   a sensor attachment step of attaching, to a head portion of the bolt, a looseness detection sensor comprising a resonance unit arranged adjacent to the head portion and made of an insulating material confining a high-frequency signal input externally and a conductive member in conduction with the component across the resonance unit, wherein the conductive member is a cap put on the head portion;
   a reflected wave reception step of sweeping and applying a high-frequency signal in a predetermined range of frequencies to the looseness detection sensor and receiving a reflected wave of the high-frequency signal;
   a peak value record step of recording a peak value of the reflected wave;
   a comparison step of comparing the peak value and a previous peak value and calculating an amount of change; and
   a determination step of determining that the looseness does not occur when the amount of change is less than a threshold and determining that the looseness occurs when the amount of change is greater than or equal to the threshold.

* * * * *